United States Patent
Katayama et al.

(10) Patent No.: US 6,502,559 B2
(45) Date of Patent: Jan. 7, 2003

(54) FUEL VAPOR EMISSION SYSTEM

(75) Inventors: Goichi Katayama, Shizuoka (JP); Masashi Nonaka, Shizuoka (JP); Masaki Okazaki, Shizuoka (JP)

(73) Assignee: Sanshin Kogyo Kabushiki Kaisha, Hamamatsu (JP)

( * ) Notice: Subject to any disclaimer, the term of this patent is extended or adjusted under 35 U.S.C. 154(b) by 0 days.

(21) Appl. No.: 09/999,529

(22) Filed: Nov. 15, 2001

(65) Prior Publication Data

US 2002/0040706 A1 Apr. 11, 2002

Related U.S. Application Data

(62) Division of application No. 09/648,827, filed on Aug. 25, 2000.

(30) Foreign Application Priority Data

Aug. 26, 1999 (JP) .......................................... 11-240340

(51) Int. Cl.⁷ .............................................. F02M 37/04
(52) U.S. Cl. ...................................... 123/516; 123/541
(58) Field of Search ................................ 123/516, 514, 123/541

(56) References Cited

U.S. PATENT DOCUMENTS

| | | | | |
|---|---|---|---|---|
| 4,220,127 A | * | 9/1980 | Reynolds | 123/573 |
| 4,872,438 A | | 10/1989 | Ausiello et al. | |
| 5,137,002 A | * | 8/1992 | Mahoney et al. | 123/516 |
| 5,309,885 A | * | 5/1994 | Rawlings | 123/516 |
| 5,450,831 A | | 9/1995 | Fukuoka | |
| 5,501,202 A | | 3/1996 | Watanabe | |
| 5,555,858 A | | 9/1996 | Katoh | |
| 5,653,103 A | | 8/1997 | Katch | |
| 5,794,602 A | | 8/1998 | Kimura | |
| 5,819,711 A | | 10/1998 | Motose | |
| 5,890,472 A | | 4/1999 | Saito | |
| 5,899,197 A | | 5/1999 | Watanabe et al. | |
| 5,931,141 A | * | 8/1999 | Chino | 123/541 |
| 6,006,705 A | * | 12/1999 | Kato et al. | 123/73 AD |
| 6,009,859 A | * | 1/2000 | Roche et al. | 123/541 |
| 6,012,434 A | * | 1/2000 | Hartke | 123/516 |
| 6,035,836 A | | 3/2000 | Watanabe | |
| 6,062,928 A | | 5/2000 | Watanabe et al. | |
| 6,076,509 A | * | 6/2000 | Kyuma | 123/516 |
| 6,125,827 A | | 10/2000 | Wada et al. | |
| 6,148,807 A | | 11/2000 | Hazen | |
| 6,279,546 B1 | * | 8/2001 | Nakase et al. | 123/526 |
| 6,308,692 B1 | * | 10/2001 | Ishikawa et al. | 123/516 |
| 6,328,020 B1 | * | 12/2001 | Wada et al. | 123/516 |

FOREIGN PATENT DOCUMENTS

| | | |
|---|---|---|
| JP | 10-1844478 | 7/1998 |
| JP | 11-82205 | 3/1999 |
| JP | 11-91689 | 4/1999 |
| JP | 11-193760 | 7/1999 |

* cited by examiner

Primary Examiner—Marguerite McMahon
(74) Attorney, Agent, or Firm—Knobbe, Martens, Olson & Bear, LLP

(57) ABSTRACT

An engine includes an air induction system, a fuel supply system, a lubrication system and a ventilation system. The fuel supply system has a fuel reservoir in which a space for fuel vapors is defined. The lubrication system lubricates a component of the engine with lubricant. The ventilation system couples a crankcase of the engine with the air induction system so as to deliver oil vapors in the crankcase to the air induction system. A fuel vapor passage is arranged to couple the space of the fuel reservoir with the ventilation system.

10 Claims, 7 Drawing Sheets

FUEL VAPOR EMISSION SYSTEM

PRIORITY INFORMATION

This application is a divisional application of U.S. patent application Ser. No. 09/648,827 filed Aug. 25, 2000, which claims priority under §119(a)–(d) to Japanese Application No. 11-240340, filed Aug. 26, 1999, the entire contents of these prior related applications is hereby expressly incorporated by reference.

BACKGROUND OF INVENTION

1. Field of the Invention

This invention relates to a fuel vapor emission system, and more particularly to a fuel vapor emission system suitable for a fuel injection system.

2. Description of Related Art

A typical fuel injection system for an internal combustion engine has a fuel tank, a low-pressure fuel pump, a fuel vapor separator, a high-pressure fuel pump, a fuel injector and an injection control device. The low-pressure fuel pump delivers fuel from the fuel tank to the fuel vapor separator through a first delivery passage under a relatively low pressure. The high pressure fuel pump, in turn, delivers the fuel that has been delivered to the vapor separator further to the fuel injector through a second delivery passage under a relatively high pressure. The fuel injector sprays the fuel into an air induction system of the engine or directly to a combustion chamber of the engine, under control of the injection control device. Excess fuel returns to the vapor separator through a return passage.

The vapor separator is installed in this system for separating fuel vapors, which can be produced in the first delivery passage, from the liquid fuel. Without such a vapor separator, the vapors can mixed with the sprayed fuel and vary an air/fuel ratio thereof, despite the operation of the fuel injection control device, thus causing undesirable or poor engine performance.

The fuel vapors accumulate in a space defined above the liquid fuel within the vapor separator. Conventionally, a vent is provided atop the vapor separator and this vent is normally coupled with a plenum chamber of the air induction system so as to introduce the vapors into the combustion chamber with the air to be burned therein. In some engines, the vent is connected to an exhaust manifold of an exhaust system so as to burn off the fuel vapors by the heat of exhaust gases. For example, U.S. Pat. No. 5,653,103 discloses such conventional arrangements.

A problem arises when an engine is restarted immediately after a relatively long period of operation, and in particular, continuous high speed and/or high load operation. During such operation, not only the engine, but peripheral devices and units including the vapor separator, absorb or generate intense heat therein. That is, with regard to the vapor separator, a temperature of the liquid fuel rises and hence the fuel becomes likely to produce a large amount of fuel vapors that accumulate in the space above the liquid fuel.

When the engine is restarted under such circumstances, the high-pressure fuel pump supplies the fuel to the fuel injector and excess fuel, which has been pressurized by the high-pressure fuel pump, returns to the vapor separator. The return fuel is, thus, abruptly depressurized on its way to the vapor separator and expedites the production of the fuel vapors in the vapor separator. The higher the temperature of the return fuel, the more vapors are produced.

If the vent of the vapor separator is directly connected to the air induction system as noted above, the vapors will be added onto a fuel charge that has been measured by the injection control device and shifts the air/fuel ratio to a rich side. This shift of the air/fuel ratio, for example, causes an engine stall and makes it difficult to start the engine again.

Some of the foregoing arrangements in U.S. Pat. No. 5,653,103, therefore, include a fuel vapor reduction canister in a vapor path that couples the vapor separator with the air induction system. The canister is, however, a relatively costly and cumbersome.

A need therefore exists for an improved fuel vapor emission system that can remove vapors from a vapor separator so as to prevent an engine from stalling or causing other undesirable performance without the need for a canister or other special devices.

Another need also exists for an improved fuel vapor system that can remove heat from excess fuel before returning to a vapor separator.

A marine propulsion system such as an outboard motor can of course employ the foregoing engine. Outboard motors normally includes a drive unit having an engine and a bracket assembly that is mounted on an associated watercraft. The drive unit is coupled to the bracket assembly for pivotal movement about a tilt axis so that the drive unit is tiltable relative to the watercraft. Because of this peculiar nature of the outboard motor, another problem arises with the engine disposed on the drive unit. That is, with the pivotal movement of the drive unit, the engine also pivots and the liquid fuel in the vapor separator can close the vent provided atop thereof. The vapors under this condition, therefore, cannot flow out from the vapor separator, or the liquid fuel itself, rather than the vapors, may flow out to the air induction system. Both of these situations apparently give rise to undesirable engine performance.

A need therefore exists for an improved fuel vapor emission system that allows vapors in a vapor separator to flow reliably escape and/or prevent liquid fuel from flowing out.

SUMMARY OF THE INVENTION

In accordance with one aspect of the present invention, an internal combustion engine comprises a cylinder body defining a cylinder bore in which a piston reciprocates. A cylinder head member closes one end of the cylinder bore and defines a combustion chamber with the cylinder bore and the piston. A crankcase member closes the other end of the cylinder bore to define a crankcase in which a crankshaft is journaled for rotation. An air induction system is arranged to introduce air to the combustion chamber. A fuel supply system is arranged to supply fuel to the combustion chamber. The fuel supply system includes a fuel reservoir in which a space for fuel vapors is defined. A lubrication system is arranged to lubricate at least one of the piston and the crankshaft by lubricant oil. A ventilation system is arranged to couple the crankcase with the air induction system so as to deliver at least oil vapors in the crankcase to the air induction system. A fuel vapor passage is arranged to couple the space of the fuel reservoir with the ventilation system.

In accordance with another aspect of the present invention, an internal combustion engine comprises a cylinder body defining a cylinder bore in which a piston reciprocates. A cylinder head member closes one end of the cylinder bore and defines a combustion chamber with the cylinder bore and the piston. A fuel supply system is arranged to supply fuel for combustion in the combustion chamber. The fuel supply system includes a fuel reservoir in which a space for fuel vapors is defined. A check valve mechanism is arranged to release the fuel vapors from the fuel reservoir at a pressure of the fuel vapors that is greater than a preset pressure.

In accordance with a further aspect of the present invention, an internal combustion engine comprises a cylinder body defining a cylinder bore in which a piston reciprocates. A cylinder head member closes one end of the cylinder bore and defines a combustion chamber with the cylinder bore and the piston. A fuel supply system is arranged to supply fuel for combustion in the combustion chamber. The fuel supply system includes a fuel reservoir in which a space for fuel vapors is defined. A pair of separate passages extend from the fuel reservoir at respective vents spaced apart from each other. The separate passages cross each other.

In accordance with yet another aspect of the present invention, an internal combustion engine comprises a cylinder body defining a cylinder bore in which a piston reciprocates. A cylinder head member closes one end of the cylinder bore and defines a combustion chamber with the cylinder bore and the piston. A fuel injector is arranged to spray fuel for combustion in the combustion chamber. A fuel reservoir is configured to contain the fuel. A fuel pump is arranged to pressurize the fuel in the fuel reservoir to the fuel injector. A fuel return passage is arranged to return excess fuel to the fuel reservoir. A heat exchanger is arranged to remove heat from the fuel flowing through the fuel return passage. The heat exchanger is mounted on the engine via a heat insulator.

Further aspects, features and advantages of the present invention will become apparent from the detailed description of the preferred embodiments which follow.

BRIEF DESCRIPTION OF THE DRAWINGS

These and other features of the present invention will now be described with reference to the drawings of preferred embodiments which are intended to illustrate and not to limit the invention. The drawings contain the following figures.

DETAILED DESCRIPTION OF THE PREFERRED EMBODIMENT

Figure 1:
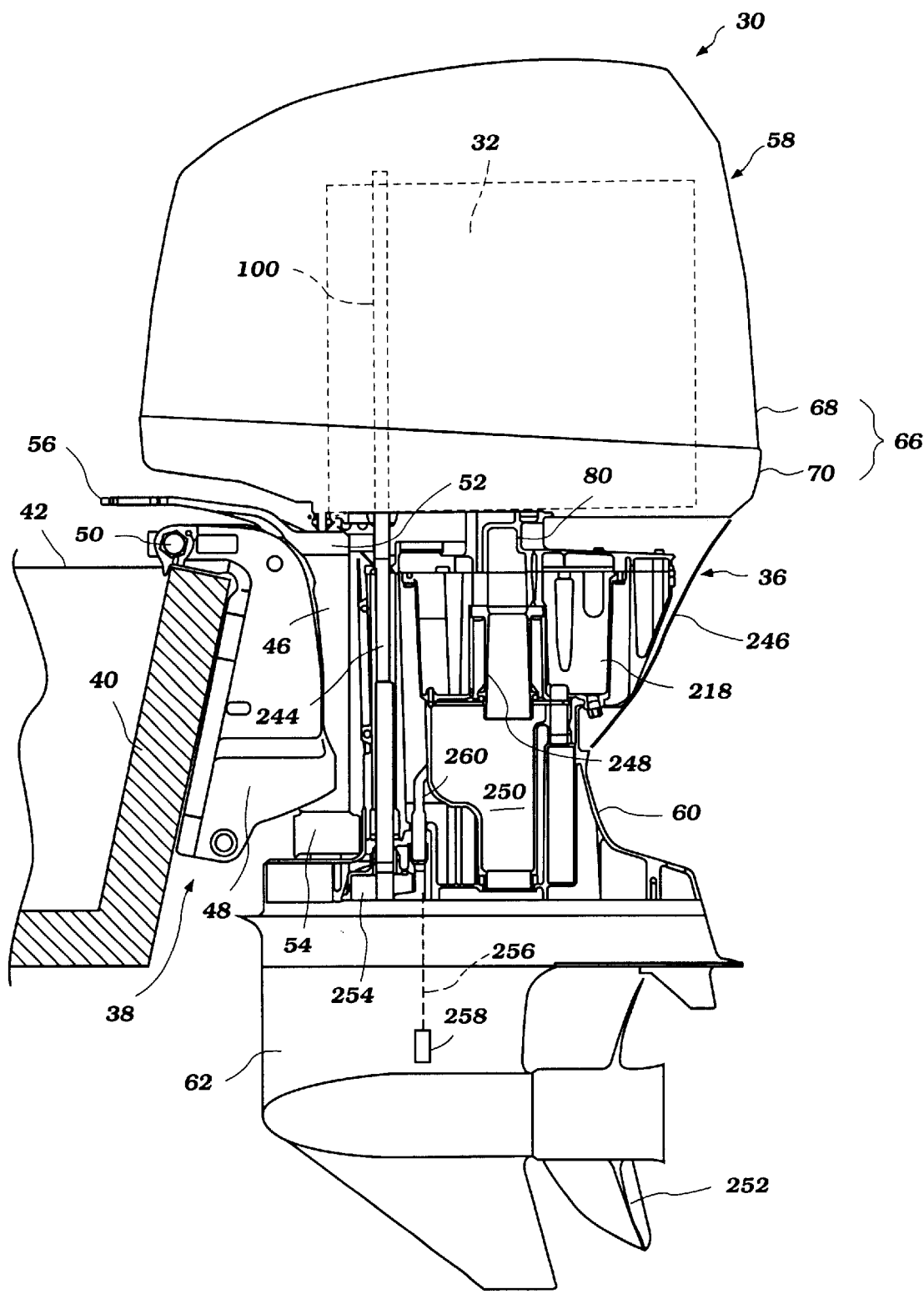
FIG. 1 is a side elevational view of an outboard motor employing an engine that includes a fuel vapor emission system arranged in accordance with a preferred embodiment of the present invention.

With reference to FIGS. 1 to 6, an outboard motor 30 employs an internal combustion engine 32 having a fuel vapor emission system 34 (see FIGS. 2 to 5) arranged in accordance with a preferred embodiment of the present invention. Although the present invention is shown in the context of an engine for an outboard motor, various aspects and features of the present invention also can be employed with engines for other types of marine outboard drive units (e.g., a stem drive unit) and also with other types of engines (e.g., land vehicle engines and stationary engines).

In the illustrated embodiment, the outboard motor 30 comprises a drive unit 36 and a bracket assembly 38. The bracket assembly 38 supports the drive unit 36 on a transom 40 of an associated watercraft 42 so as to place a marine propulsion device in a submerged position with the watercraft 42 resting on the surface of a body of water. The bracket assembly 38 comprises a swivel bracket 46, a clamping bracket 48, a steering shaft and a pivot pin 50.

The steering shaft extends through the swivel bracket 46 and is affixed to the drive unit 36 with an upper mount assembly 52 and a lower mount assembly 54. The steering shaft is pivotally journaled for steering movement about a generally vertically extending steering axis within the swivel bracket 46. A steering handle 56 extends upwardly and forwardly from the steering shaft to steer the drive unit 36. The clamping bracket 48 includes a pair of bracket arms spaced apart from each other and affixed to the transom 40 of the associated watercraft 42. The pivot pin 50 completes a hinge coupling between the swivel bracket 46 and the clamping bracket 48. The pivot pin 50 extends through the bracket arms so that the clamping bracket 48 supports the swivel bracket 46 for pivotal movement about a generally horizontally extending tilt axis of the pivot pin 50. Although not shown, a hydraulic tilt and trim adjustment system is provided between the swivel bracket 46 and the clamping bracket 48 to tilt up and down and also for the trim adjustment of the drive unit 36.

As used through this description, the terms "fore," "front," forward" and "forwardly" mean at or to the side where the clamping bracket 48 is located, and the terms "aft," "rear," "reverse" and "rearwardly" mean at or to the opposite side of the front side, unless indicated otherwise or otherwise readily apparent from the context of use.

The drive unit 36 includes a power head 58, a driveshaft housing 60 and a lower unit 62. The power head 58 is disposed atop the drive unit 36 and includes the engine 32 and a protective cowling assembly 66. The protective cowling assembly 66 includes a top cowling member 68 and a bottom cowling member 70.

The protective cowling assembly 66 generally completely surrounds the engine 32 so as to enclose it in a closed cavity. The top cowling member 68 is detachably affixed to the bottom cowling member 70 with a conventional coupling mechanism so that the operator can access the engine 32 for maintenance or for other purposes.

Figure 3:
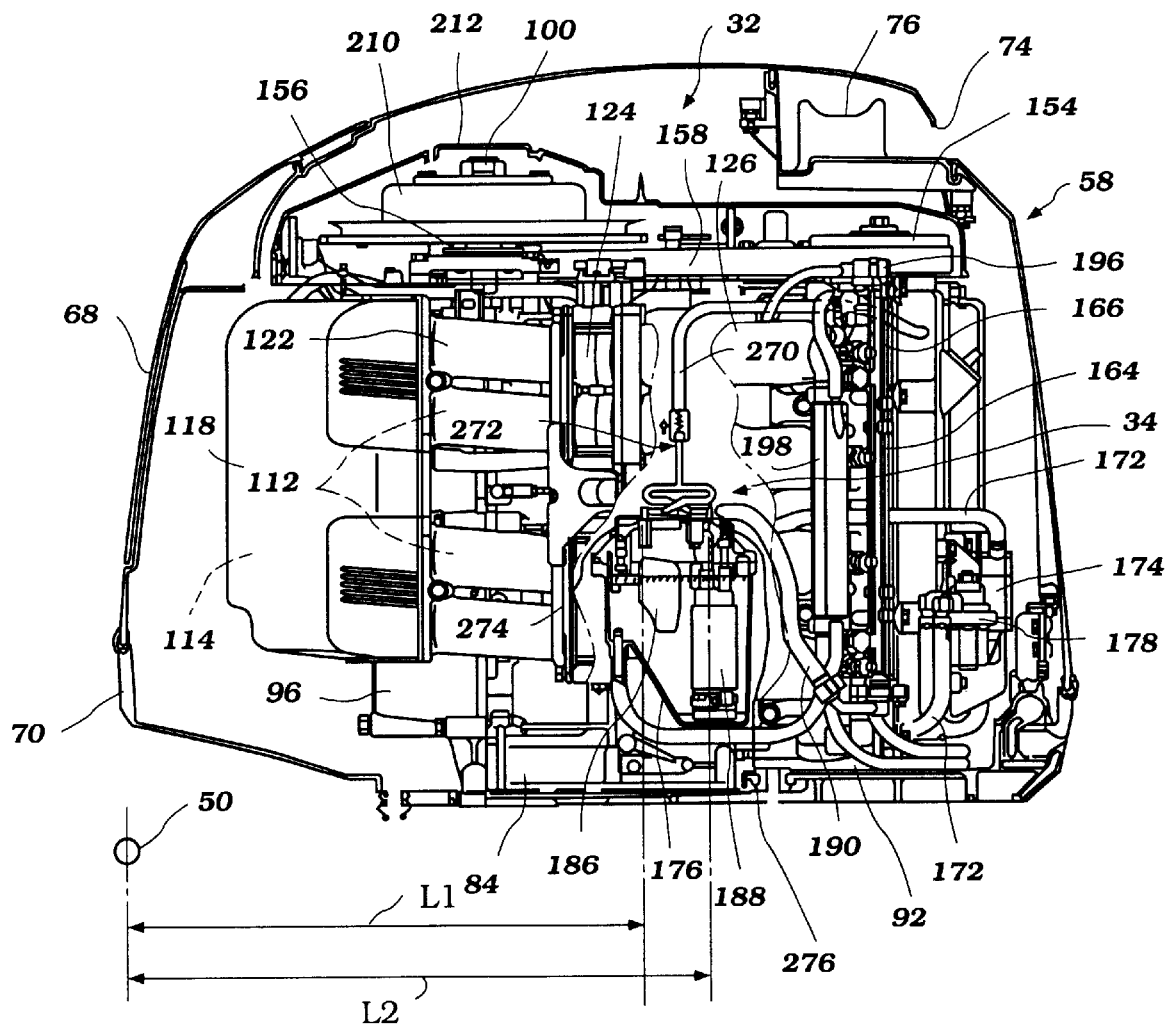
FIG. 3 is a side elevational view of a power head portion of the outboard motor. A top cowling member of the power head is shown in section taken generally along a centerline of the cowling member so that a side of the engine is fully shown. An air induction system is partially broken away to show the fuel vapor emission system. A vapor separator is shown in section.

As seen in FIG. 3, the top cowling member 68 has an air intake opening 74 disposed on its rear and top portion. A pair of air intake ducts 76 is provided at a position adjacent to the intake opening 74 so that ambient air enter the closed cavity through the opening 74 and the intake ducts 76.

The bottom cowling member 70 has an opening at its bottom portion through which an upper portion of an exhaust guide member 80 extends. The exhaust guide member 80 is affixed atop the driveshaft housing 60. The bottom cowling member 70 and the exhaust guide member 80, thus, generally form a tray. The engine 32 is placed onto this tray and is affixed to the exhaust guide member 80 so as to be supported thereby. The exhaust guide member 80 also has an exhaust passage therein, through which a burnt charge (e.g., exhaust gases) from the engine 32 is discharged as described below.

The engine 32 in the illustrated embodiment operates on a four-stroke combustion principle and powers a propulsion device. The engine 32 has a cylinder body 84. The cylinder body 84 defines four cylinder bores which extend generally horizontally and which are spaced generally vertically apart from each other. That is, the engine 64 is a horizontal cylinder, L4 (in-line four cylinder) type. This type of engine, however, is merely exemplary of a type on which various aspect and features of the present invention can be used. Engines having other number of cylinders, having other cylinder arrangements, and operating on other combustion principles (e.g., crankcase compression two-stroke or rotary) are all practicable.

Figure 2:
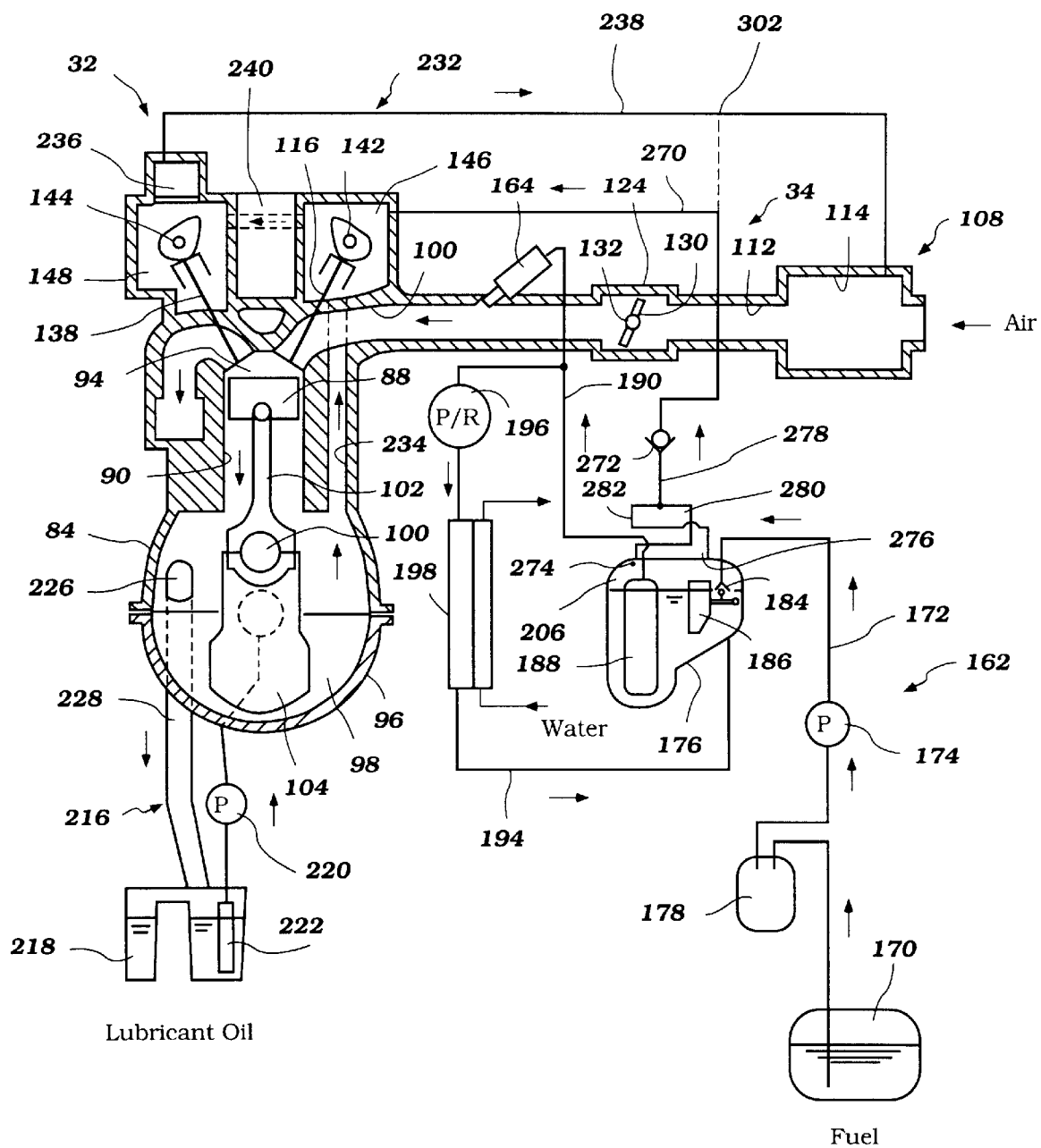
FIG. 2 is a schematic view of the engine including an air induction system, a fuel supply system, a lubrication system and a ventilation system as well as the fuel vapor emission system. The engine is schematically shown in section taken through one cylinder.
Figure 5:
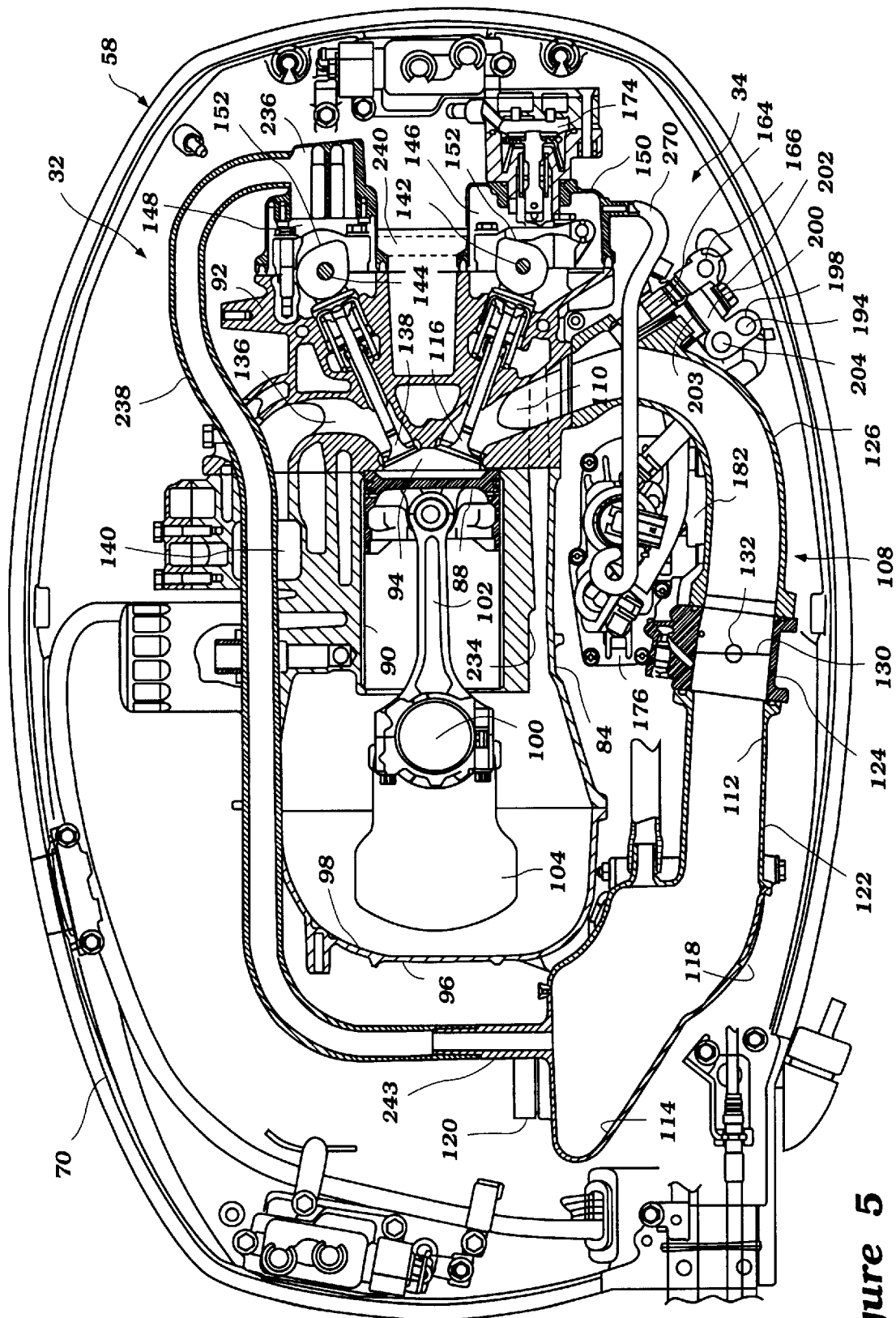
FIG. 5 is a top plan view of the power head. The top cowling member is detached to show the engine. The engine is shown in section taken through one cylinder.

As seen in FIGS. 2 and 5, a piston 88 reciprocates in each cylinder bore 90. A cylinder head member 92 is affixed to one end of the cylinder body 84. The cylinder head member 92 defines four combustion chambers 94 with the pistons 88 and the cylinder bores 90.

The other end of the cylinder body 84 is closed with a crankcase member 96 that defines a crankcase chamber 98 with the cylinder body 84. A crankshaft 100 extends generally vertically through the crankcase chamber 98. The crankshaft 100 is rotatably connected to the respective pistons 88 by connecting rods 102 and thus rotates with the reciprocal movement of the pistons 88. Counter weights 104 are provided on the crankshaft 100 oppositely to the connecting rods 102 so as to effectively provide balance with the total weight of the other side including combustion power received by the pistons 88.

The crankcase member 96 is located at the forward-most position. The cylinder body 84 and the cylinder head member 92 extend rearwardly from the crankcase member 96 one after another. The major engine components 84, 92, 96 preferably are made of aluminum alloy.

The engine 32 includes an air induction system 108. The air induction system 108 introduces the air from the closed cavity of the cowling assembly 66 to the combustion chambers 94. The air induction system 108 comprises four intake ports 110, four air intake passages 112 and a single plenum chamber 114. The intake ports 110 are defined in the cylinder head member 92 and are opened and closed by intake valves 116. When each intake port 110 is opened, the corresponding intake passage 112 communicates with the associated combustion chamber 94.

The plenum chamber 114 is defined within a plenum chamber member 118 that is made of plastic material or aluminum alloy and mounted on the port side of the crankcase member 96 in a conventional manner. The plenum chamber member 118 has an air inlet 120 that communicates to the plenum chamber 114. The plenum chamber 114 functions as an intake silencer and a collector of air charges. The air intake passages 112 connect the plenum chamber 114 to the intake ports 110. The air intake passages 112 extend rearwardly from the plenum chamber 114 along the port side surface of the cylinder body 84 and then bend toward the intake ports 110.

As best seen in FIG. 5, the air intake passages 112 are defined by intake runners 122, throttle bodies 124 and intake manifolds 126 which are made of aluminum alloy. In the illustrated embodiment, the intake runners 122 are unified with the plenum chamber member 118. The intake runners 122 connect the plenum chamber member 118 to the throttle bodies 124, while the intake manifolds 126 connect the throttle bodies 124 to the cylinder head member 92 so that the plenum chamber 114 communicates with the intake ports 110 via passages defined in the throttle bodies 124.

The respective throttle bodies 124 support throttle valves 130 disposed therein for pivotal movement about axes of valve shafts 132 which extend generally vertically. The valve shafts 132 are linked together to form a single valve shaft that passes through each of the throttle bodies 124. The throttle valves 130 are operable by the operator through a suitable throttle cable and a linkage mechanism.

When the operator operates the throttle cable, the linkage mechanism activates the valve shaft 132 to open the throttle valves 130 for adjusting an amount of air passing therethrough. Conversely, when the throttle cable is released, the linkage mechanism moves the valve shaft 132 to close the throttle valves 130.

The engine 32 includes an exhaust system. The exhaust system discharges the burnt charge (e.g., exhaust gases) outside of the outboard motor 30 from the combustion chambers 94. Exhaust ports 136 are defined in the cylinder head member 92 and are opened and closed by exhaust valves 138. When the exhaust ports 110 are opened, the combustion chambers 94 communicate with exhaust manifold 140 defined within the cylinder body 84. The exhaust manifold 140 communicates with the exhaust passage defined by the exhaust guide member 80.

An intake camshaft 142 and an exhaust camshaft 144 extend generally vertically within an intake camshaft chamber 146 and an exhaust camshaft chamber 148, respectively. A camshaft cover member 150 defines the separate cam chambers 146, 148 with the cylinder head member 92. The intake cam shaft 142 is provided to activate the intake valves 116, while the exhaust cam shaft 138 is provided to activate the exhaust valves 138. The respective camshafts 142, 144 have cam lobes 152 to push the intake and exhaust valves 116, 138 at predetermined timings to open and close the intake and exhaust ports 110, 136, respectively.

The camshafts 142, 144 are journaled on the cylinder head member 92 with camshaft caps and are driven by the crankshaft 100. The respective camshafts 142, 144 have sprockets 154 fitted thereon, and the crankshaft 100 also has a sprocket 156 fitted thereon. A cogged belt or timing chain 158 is wound around the sprockets 154, 156. With rotation of the crankshaft 100, the camshafts 142, 144 also rotate. A tensioner (not shown) is provided to adjust the tension of the belt or chain 158 by pushing it inwardly so as to keep accurate opening and closing timings of the intake and exhaust valves 116, 138.

In the illustrated embodiment, the engine 32 has a fuel injection system 162, although other conventional fuel supply and charge forming systems such as carburetors can be used for supplying fuel for combustion in the combustion chambers 94. The fuel injection system 162 includes four fuel injectors 164 which have injection nozzles directed toward the respective intake ports 110. The fuel injectors 164 spray fuel into the intake ports 110 under a control of an ECU (Electronic Control Unit), which is not shown. More specifically, the ECU controls a fuel amount and a timing of each injection. The fuel injectors 164 are supported by a fuel rail 166 that is affixed to the intake manifolds 126.

As seen in FIG. 2, the fuel supply system 162 further includes a fuel supply tank 170 that is provided in the hull of the associated watercraft 42 and contains fuel that will be sprayed by the fuel injectors 164. Fuel is drawn from the fuel tank 170 through a fuel supply passage 172 by a low pressure fuel pump 174 which supplies the fuel to a fuel reservoir or fuel vapor separator 176. The low-pressure fuel pump 174 is operated by the cam lobe 146 of the intake camshaft 142, and thus provides a relatively low pressure. A fuel filter 178 is positioned in the fuel passage 172 to remove alien substances.

As seen in FIG. 5, the vapor separator 176 is generally disposed at a space 182 defined between the port side surface of the cylinder body 84 and the intake manifolds 126, and is affixed to the intake manifolds 126. A float valve 184 is provided at the end of the passage 172 and is operated by a float 186 so as to maintain a uniform level of the fuel in the vapor separator 176. A high pressure fuel pump 188 is provided within the vapor separator 176 and pressurizes the fuel that is delivered to the fuel injectors 164 through a fuel delivery passage 190 which includes the fuel rail 166. The high-pressure fuel pump 188 is an electric pump that is driven by an electric motor and develops a pressure greater than the pressure developed by the low-pressure fuel pump 174, i.e., the cam-operated pump.

A fuel return passage 194 connects a portion of the fuel delivery passage 190 to the vapor separator 176 to return excess fuel thereto. A pressure regulator 196 is positioned in this passage 190 atop the fuel rail 166 and limits the pressure that is delivered to the fuel injectors 164 to a preset and fixed magnitude by dumping the fuel back to the vapor separator 176 when the pressure in the fuel rail 166 is greater than the preset magnitude. Because the pressure regulator 196 keeps the pressure at this constant magnitude, the ECU can measure or meter the amount of fuel sprayed by controlling the duration of each injection.

The fuel return passage 194 further includes a heat exchanger or cooler 198. In the illustrated embodiment, the heat exchanger 198 extends generally vertically along the fuel rail 166 and is affixed to the intake manifolds 126 with a flange 200 by bolts 202 via a heat insulator 203. A water passage 204 as well as the return passage 194 passes through a body of the heat exchanger 198. The water passage 204 extends along the return passage 194 and in close proximity thereto. The water flowing through the water passage 204, thus, efficiently removes the heat in the return fuel. Accordingly, the fuel that has returned to the vapor separator 176 has been cooled and thus releases less vapor upon returning to the vapor separator 176. A water cooling system which supplies water to the passage 204 will be described below in more detail.

Because the flange 200 of the heat exchanger 198 is affixed to the intake manifolds 126 via the heat insulator 203, the transfer of heat accumulated in the engine 32 to the return fuel is attenuated. The intake manifolds 126 themselves are further cooled by air flowing therethrough. This arrangement thus further enhances heat reduction.

Additionally, surfaces of the engine 32 and devices and units including the vapor separator 176, the heat exchanger 198 and the various conduits disposed within the closed cavity of the cowling assembly 66 are also cooled by the air introduced into the cavity.

The fuel level of the vapor separator 176 is limited by the float valve 184 as noted above, thus maintaining a space 206 is defined above the fuel in the vapor separator 176. Fuel vapors accumulate in this space 206 because vapors are lighter than the liquid fuel. The fuel vapors are, thus, separated from the liquid fuel in the vapor separator 176. The fuel vapor emission system 34 is coupled with this space 206 and its construction is described in more detail later.

Although not specifically shown, the engine 32 also includes an ignition or firing system. Four spark plugs (not shown) are mounted on the cylinder head member 92 so as to expose electrodes to the respective combustion chambers 94. The spark plugs fire air/fuel charges in the respective combustion chambers 94 according to an appropriate ignition timing scheme. The ignition timing is also controlled by the ECU. As noted above, such an air/fuel charge is formed with the air supplied by the air induction system 108 and the fuel sprayed by the fuel injectors 164 of the fuel injection system 162.

A flywheel assembly 210 is affixed atop the crankshaft 100. The flywheel assembly 210 includes a generator for supplying electric power to the firing system, the ECU and other electrical equipment directly and/or via a battery. The battery (not shown) is normally disposed in the hull of the watercraft 42. A protector 212 covers the flywheel assembly 210, sprockets 154, 156 and the belt 158 for protection of the operator from such moving parts.

As best seen in FIG. 2, the engine 32 includes also a lubrication system 216. A lubricant reservoir or oil pan 218 depends from the exhaust guide member 80 into the driveshaft housing 60 and contains lubricant oil. An oil pump 220 is coupled to the crankshaft 100 or one of the camshafts 142, 144 so as to be driven thereby. The lubricant in the lubricant reservoir 218 is drawn by the oil pump 220 and delivered to engine portions that benefit from lubrication. An oil strainer 222 is provided at an outlet port in the lubricant reservoir 218 so as to remove alien substances from the lubricant oil.

Such engine portions include, for example, crankshaft bearing portions, the pistons 88 that reciprocate within the cylinder bores 90 and camshaft bearing portions. Although normally the lubricant oil that lubricates the camshaft bearing portions is separately delivered, the lubricant oil that lubricates the crankshaft bearing portions and the pistons 88 is delivered through a common lubricant passage. That is, the lubricant oil is at first delivered to the crankshaft bearing portions through a lubricant path formed internally of the crankshaft 100 itself and then part of the lubricant oil is further delivered to the pistons 88 through a lubricant path formed within the connecting rods 102.

Lubrication aids in preventing the pistons 88 from seizing on surfaces of the cylinder bores 90. One or more throughholes are made at each skirt portion of the piston 88 and hence the lubricant can flow out to the outer surface of the piston 88 which slides along the surface of the cylinder bore 90. Piston rings are provided on and around the pistons 88 primarily to isolate the combustion chambers 94 from the crankcase chambers 98. At least one piston ring, which is normally placed at the lowermost position, can remove the lubricant from the surface of the cylinder bore 90 and move it to the crankcase chamber 98.

After lubricating the various engine components, most of the lubricant returns to the lubricant reservoir 218 through a drain port 226 and a drain passage 228 extending from the port 226. The lubricant that has returned to the lubricant reservoir 218 is recycled so as to lubricate the engine portions repeatedly.

Some of the lubricant, however, adheres on the engine components and internal walls of the crankcase chamber 98 and the camshaft chambers 142, 148 rather than returning to the lubricant reservoir 218. This remaining lubricant vaporizes when the engine 32 is heated through continuous operation and these lubricant vapors can fill the crankcase chamber 98 and the camshaft chambers 142, 148. In addition, unburnt charges containing a small amount of the exhaust gas can leak to the crankcase chamber 98 from the combustion chambers 94 as "blow-by gas" due to the expansion pressures generated therein, despite the effects of the piston rings.

In order to remove the oil vapors and the blow-by gases from these chambers 98, 146, 148, the engine 32 in the illustrated embodiment has a ventilation system 232. This ventilation system 232 burns the oil vapors and the blow-by gases in the combustion chambers 94. The ventilation system 232 includes an inner ventilation passage 234, an oil separator or breather 236 and an outer ventilation passage 238. In the illustrated embodiment, the camshaft chambers 146, 148 define part of the ventilation system 232. For this purpose, both the camshaft chambers 146, 148 are connected by an inter-camshaft chamber passage 240 defined within the camshaft cover member 150.

The inner ventilation passage 234 is defined internally of the cylinder body 84 and the cylinder head member 92 to connect the crankcase chamber 98 with the intake camshaft chamber 146. The intake camshaft chamber 146 is coupled with the exhaust camshaft chamber 148 via the inter-camshaft passage 240. The exhaust camshaft chamber 148 communicates with the oil separator 236.

The oil separator 236 separates liquid oil components from the oil vapors by guiding the vapors to flow through a labyrinth structure defined therein. Thus, the oil separator 236 is an oil vapor separator that separates the oil vapors from the liquid oil components. Because the blow-by gases also contain oil components, these oil components are also separated by the oil separator 236. The oil separator 236 is defined in a camshaft cover member 150 so as to be unified with the exhaust camshaft chamber 148. The oil vapors and the blow-by gases which have no liquid oil components proceed to the outer ventilation passage 238, while the liquid components drop down to a drain (not shown) that communicates with the drain passage 228 and return back to the lubricant reservoir 218.

The outer passage 238 couples the oil separator 236 with a ventilation inlet port 243 of the plenum chamber 114 so as to deliver the oil vapors and blow-by gases to the induction system 108. As seen in FIG. 5, the outer passage 238 extends along the cylinder body 84 on the starboard side, and more specifically, generally along the top periphery of the cylinder body 84.

The engine 32 further includes a water cooling system that provides cooling water or coolant to engine portions, for example, the cylinder body 84 and the cylinder head member 92, and also to the exhaust system, so as to dissipate or remove heat generated during engine operation. The cooling system is described below in more detail.

Additionally, the engine 32 in the illustrated embodiment has a number of engine related devices that are mounted onto the engine 32 or provided adjacently to the engine 32. For example, a starter motor, a relay box and a fuse box are mounted on or provided around the engine 32, although they are not shown.

With reference to FIG. 1, the driveshaft housing 60 depends from the power head 58 and supports a driveshaft 244 which is driven by the crankshaft 100 of the engine 32. An upper portion of the driveshaft housing 60 surrounds the lubricant reservoir 218. The lubricant reservoir 218 in this embodiment is generally "doughnut shaped" or "toroidal".

The driveshaft 244 extends generally vertically through the exhaust guide member 80 and then extends through the driveshaft housing 60 in front of the lubricant reservoir 218.

The driveshaft housing 60 also defines internal passages which form portions of the exhaust system. In the illustrated embodiment, an exhaust pipe 248 depends from the exhaust guide member 80 and extends downwardly through a center hollow of the lubricant reservoir 218. An upper portion of the exhaust pipe 248 communicates with the exhaust passage disposed therein. An exhaust expansion chamber 250 depends from a bottom of the lubricant reservoir 218. A lower portion of the exhaust pipe 248 enters the expansion chamber 250 to communicate thereto. The expansion chamber 250 has a relatively large capacity so that the exhaust gases expand there to lose energy and thus attenuates exhaust noise.

An idle exhaust passage (not shown) is branched off from one of the internal passages and opens to the atmosphere above the body of water. In the illustrated embodiment, an apron 246 covers the upper portion of the driveshaft housing 60. The idle exhaust passage extends through both an outer surface of the driveshaft housing 60 and the apron 246.

The lower unit 62 depends from the driveshaft housing 60 and supports a propulsion shaft which is driven by the driveshaft 244. The propulsion shaft extends generally horizontally through the lower unit 62. In the illustrated embodiment, the propulsion device supports a propeller 252 that is affixed to an outer end of the propulsion shaft and is driven thereby. The propulsion device, however, can take the form of a dual, a counter-rotating system, a hydrodynamic jet, or like propulsion devices.

A transmission is provided between the driveshaft 244 and the propulsion shaft. The transmission couples together the two shafts which lie generally normal to each other (i.e., at a 90° shaft angle) with a bevel gear train or the like. The transmission has a switchover or clutch mechanism to shift rotational directions of the propeller 252 to forward, neutral or reverse. The switchover mechanism is operable by the operator through a shift linkage including a shift cam, a shift rod and a shift cable.

The lower unit 62 also defines an internal passage that forms a discharge section of the exhaust system. An upper portion of this internal passage connects to the expansion chamber 250 in the driveshaft housing 60. At engine speed above idle, the majority of the exhaust gases are discharged toward the body of water through the internal passage and a hub of the propeller 208. At the idle speed of the engine 64, the exhaust gases can be discharged only through the foregoing idle exhaust passage because the exhaust pressure under this condition is smaller than the back pressure created by the body of water.

Additionally, the driveshaft housing 60 has a water pump 254 disposed therein which is driven by the driveshaft 244 for the water cooling system. The water is introduced into a water supply passage 256 by the water pump 254 through a water inlet port 258 provided on at least one surface of the lower unit 62 that opens to the body of water surrounding the lower unit 62. The water is then delivered to cooling jackets of the engine 32 and also to the water passage 204 of the heat exchanger 198 through a water delivery passage 260. After cooling these components, the water is drained through a drain passage disposed at a proper location on the engine 32 and then discharged through the hub of the propeller 252 with the exhaust gases or other discharge ports. A thermostat is provided in the drain passage. If the temperature of the water is lower than a preset temperature, the thermostat will not allow the water to flow through the drain passage thus allowing the engine 32 to heat rapidly to an appropriate operating temperature.

In a situation that the engine 32 is operated for a period of time, and particularly under a high speed and/or high load condition, and then stopped, the operator occasionally has to restart the engine 32 immediately after the stop. As the engine 32 operates under such conditions, the vapor separator 176 can accumulate heat therein and thus a temperature of the liquid fuel contained therein. Because of this, the fuel becomes likely to produce a relatively large amount of fuel vapors in the space 206 above the liquid fuel.

In addition, the high-pressure fuel pump 188 pressurizes the fuel to deliver it to the fuel injectors 164, and the excess fuel returns to the vapor separator 176. The return fuel is depressurized en route to the vapor separator 176 and expedites production additional fuel vapors in the vapor separator 176, even though the return fuel is cooled by the heat exchanger 198 in this embodiment and aids in inhibiting the production of such vapors.

The fuel vapor emission system 34 in this embodiment is provided to aid in removing or preventing the production of at least these additional fuel vapors. This system 34 primarily comprises a fuel vapor passage 270 and a check valve mechanism 272.

Figure 4:
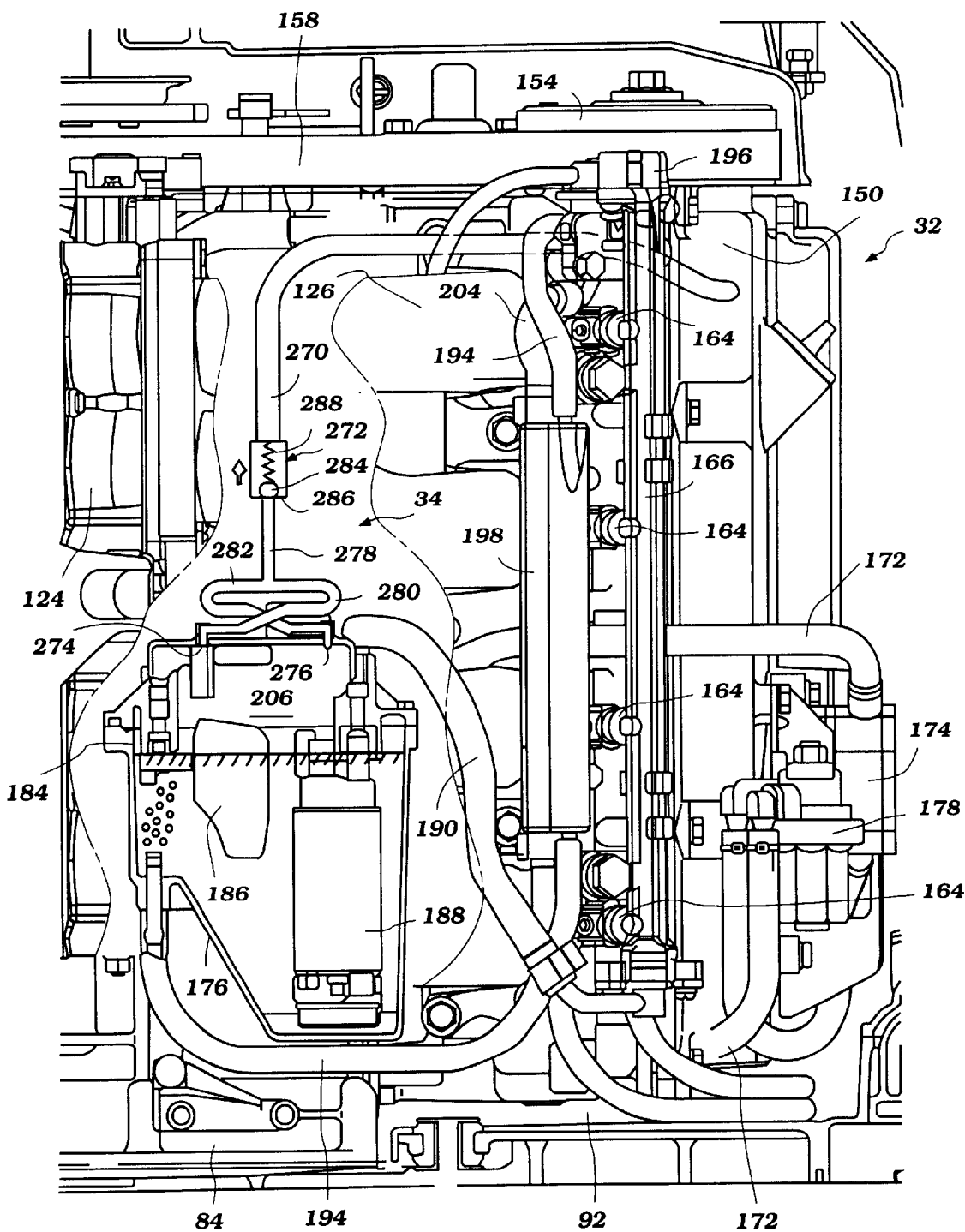
FIG. 4 is an enlarged side elevational view of the engine. The air induction system is also partially broken away to show the fuel vapor emission system. The vapor separator is also shown in section.

In the illustrated embodiment, as best seen in FIG. 2, the fuel vapor passage 270 couples the space 206 of the vapor separator 176 with the intake camshaft chamber 146 that is part of the ventilation system 232. The vapor separator 176 has a pair of vents 274, 276 atop thereof through which the vapor passage 270 communicates with the space 206. As seen in FIGS. 3 and 4, the vents 274, 276 are spaced apart from each other, and are disposed at different distances L1 and L2 from an axis of the pivot pin 50. The vapor passage 270 is divided in the portion leading to the separator 176 so as to have a common portion 278 and a pair of separate portions 280, 282. The separate portions 280, 282 cross each other and are configured as U-shapes individually. The separate portion 280 is then coupled with the vent 274, while the separate portion 282 is coupled with the vent 276 accordingly.

This configuration of the vapor passage 270 is advantageous for the engine 32, particularly during a tilting movement of th e drive unit 36. That is, if the liquid fuel closes one vent 274 (276), the other vent 276 (274) is surely opened to release the fuel vapors in the space 206. If, on the other hand, the liquid fuel flows out to one of the separate portions 280, 282, the U-shaped section blocks the fuel because the fuel cannot surmount this section.

The check valve mechanism 272 is disposed in the common passage portion 278 of the vapor passage 270 and includes, as best seen in FIG. 4, a ball valve element 284, a valve seat 286 and a spring or biasing member 288 that biases the ball valve element 284 toward the valve seat 286. The check valve mechanism 272 permits the fuel vapors to flow out to the intake camshaft chamber 146 of the ventilation system 232 but prevents the oil vapors and the blow-by gases from entering the vapor separator 176. The biasing force or pressure of the spring 288 is set at a fixed magnitude so that the ball valve element 284 stays in the closing position until a pressure of the vapors excesses the preset pressure. In other words, if the pressure of the vapors exceeds the preset pressure, then the vapors can move to the ventilation system 232 through this check valve mechanism 272. In addition, the preset pressure of the spring 288 in this embodiment is less than a pressure that is produced by the low-pressure fuel pump 174. Thus, the check valve 272 will not open under a normal operating condition of the low-pressure fuel pump 174.

Figure 6:
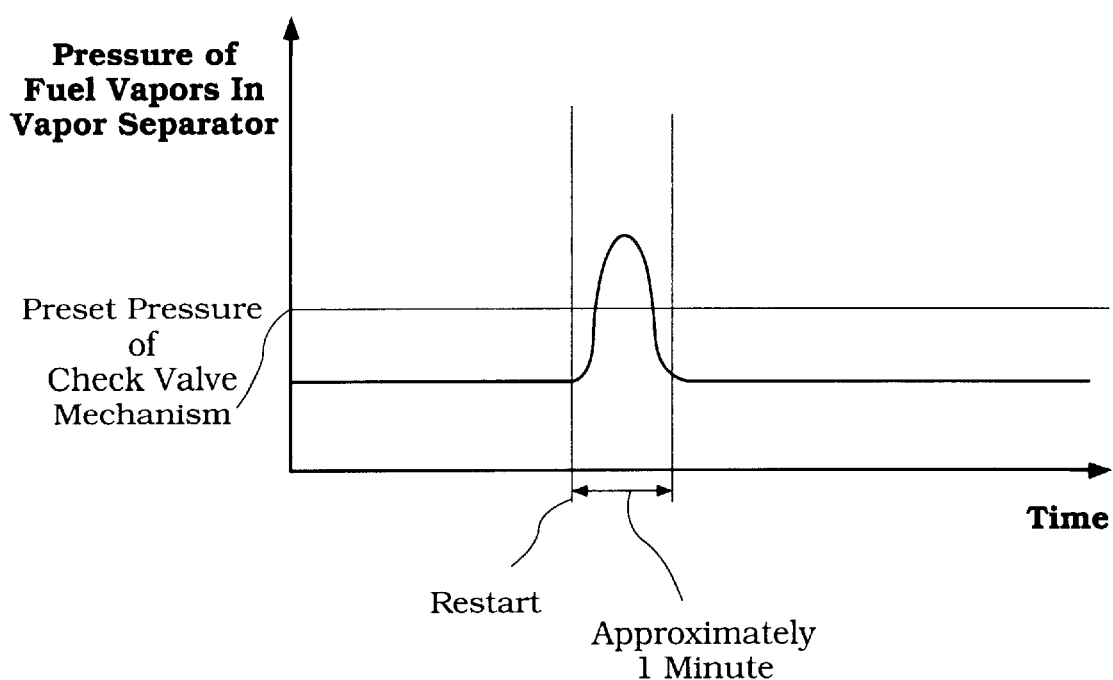
FIG. 6 is a graphical view showing a change in pressure of fuel vapors in the vapor separator before and after restarting the engine.

FIG. 6 illustrates a change in pressure of vapors in the vapor separator 176 before and after restarting the engine 32. Large amount of vapors can be produced within approximately one minute immediately after a restart of the engine 32. Due to this large amount of vapors, as reflected in this figure, the pressure of the vapors exceeds the preset pressure of the check valve mechanism 272 for a period of time, e.g., approximately one minute.

Under a condition that the drive unit 36 is not tilted and when the pressure of the vapors exceeds the preset magnitude of the check valve mechanism 272, vapors move out from both the vents 274, 276 and go through both the separate portions 280, 282 to the common portion 278 of the vapor passage 270. The vapors then move through the intake camshaft chamber 146, the inter camshaft chamber passage 240 and the exhaust camshaft chamber 148 and reach the oil separator 236. Liquid oil components are removed in the oil separator 236 while passing through the labyrinth structure thereof and thus only vapor components further move to the plenum chamber 114 of the air induction system 108. The vapors are then mixed with the induction air and finally burned in the combustion chambers 94.

It is quite advantageous to introduce the fuel vapors to the ventilation system 232 prior to entering the plenum chamber 114, preferably, prior to entering the oil separator 236 because they mixed with the oil vapors en route to the plenum chamber 114. The fuel vapors reduce the viscosity of the oil vapors, to promote better mixture with the induction air.

In addition, the unification of the fuel vapor emission system 34 with the ventilation system 232 greatly simplifies the circuitry or conduits for delivering the fuel vapor to the induction system 108. That is, a vapor reduction canister or other special devices are not required.

Further by guiding the fuel vapors through the chambers, narrow passages and labyrinth structure in the ventilation system 232, the fuel vapors, although the may initially be large, will be effectively diluted before reaching the air induction system 108. Thus, an engine stall or other undesirable performances of the engine caused by the fuel vapors can be attenuated or even eliminated.

As noted above, when the engine 32 inclines with the tilt movement of the drive unit 36, at least one of the separate portions 280, 282 of the vapor passage 270, which cross over each other and have the U-shapes, prevents the liquid fuel from flowing out or allows the vapors to escape.

The check valve mechanism 272 thus not only inhibits the vapors from passing therethrough but also prevents vapors from moving to the ventilation system 232 if the pressure of the vapors is less than the preset magnitude. The vapors, therefore, cannot continuously move to the air induction system 108 via the ventilation system 232 but only when the check valve mechanism 272 permits them to pass therethrough.

Figure 7:
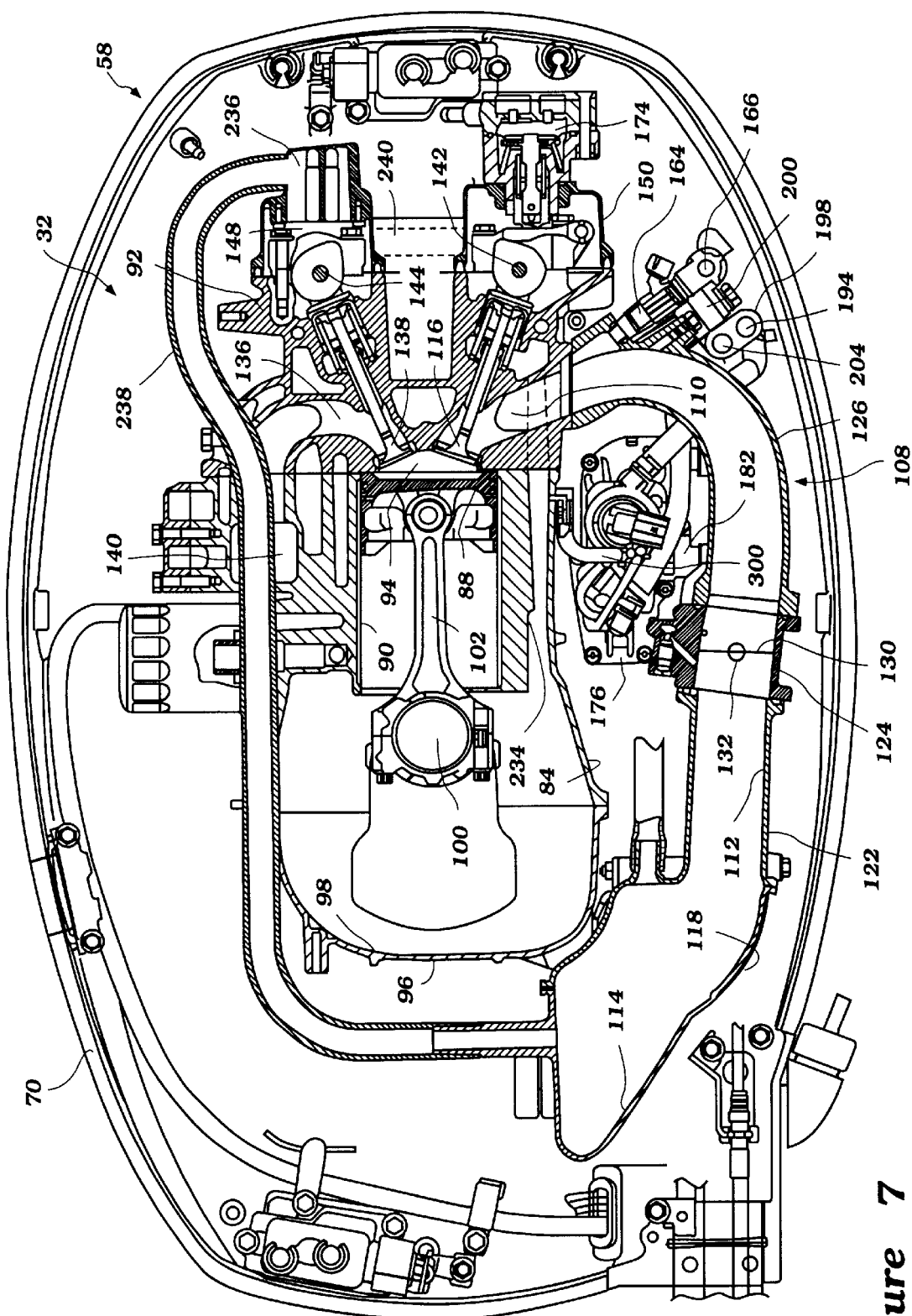
FIG. 7 is top plan view of the power head to show the fuel vapor emission system arranged in accordance with another embodiment of the present invention. The top cowling member is detached to show the engine and the engine is shown in section taken through one cylinder.

FIG. 7 illustrates another construction arranged in accordance with a second embodiment of the present invention. The same members and components that have been already described in connection with the first embodiment will be assigned with the same reference numerals and will not be described repeatedly.

In this embodiment, a fuel vapor passage 300 replaces the fuel vapor passage 270 of the first embodiment. This vapor passage 300 is coupled to the inner ventilation passage 234 that extends in close proximity to the vapor separator 176. This arrangement allows the vapor passage 300 to be shorter. In addition, the vapor passage 300 is protected by the throttle bodies 124 and the intake manifolds 126.

It should be noted that the fuel vapor emission system 34 can be coupled with any portions of the ventilation system 232. For instance, with reference to FIG. 2, the vapor passage 270 can be connected to a portion 302 of the ventilation system 232 positioned between the oil separator 236 and the plenum chamber 114 as shown in phantom line. Preferably, however, the vapor passage 270 is coupled with portions existing upstream of the oil separator 236 such as, for example, the crankcase chamber 98, the exhaust camshaft chamber 148 and a space defined above the lubricant oil in the lubricant reservoir 218. The greater the spacing of these portions from the air induction system, the more the vapors are diluted or evened out.

In some aspects of the present invention, the fuel vapor passage can be directly connected to the air induction system. Alternatively or in addition, the vapor passage can be connected with the exhaust system so as to be burn the vapors with the heat of the exhaust gases.

The ventilation passage 238 can be connected to any portions of the air induction system 108. Preferably, however, the ventilation passage 238 is coupled to portions existing upstream of the throttle valves 130 so as to avoid influence of the negative intake pressure.

It is also practicable that the fuel injectors spray fuel directly into the combustion chambers. Such a fuel injection system is commonly referred to as a "direct-injection system." Alternatively, the fuel injection system can comprise a direct "air/fuel" injection system which mixes pressurized air and fuel before or during direct injection into the combustion chamber.

Of course, the foregoing description is that of preferred embodiments of the invention, and various changes and modifications may be made without departing from the spirit and scope of the invention, as defined by the appended claims.

What is claimed is:

1. An internal combustion engine comprising a cylinder body defining a cylinder bore, a piston disposed for reciprocation within the cylinder bore, a cylinder head member closing one end of the cylinder bore to define a combustion chamber with the cylinder bore and the piston, a fuel supply system arrange to supply fuel for combustion in the combustion chamber, the fuel supply system including a fuel reservoir in which a space for fuel vapors is defined, and a pair of separate passages extending from the fuel reservoir at different vents spaced apart from each other, each separate passages crossing each other, and each separate passage being generally configured as a U-shape.

2. The internal combustion engine as set forth in claim 1, wherin the fuel supply system additionally includes a check valve mechanism arranged to release the fuel vapors from the fuel reservoir at a pressure of the fuel vapors that is greater than a preset pressure.

3. The internal combustion engine as set forth in claim 2, wherin the separate passages converge to a common passage, and the check valve mechanism is disposed in the common passage.

4. The internal combustion engine as set forth in claim 1, wherein the fuel supply system additionally includes a fuel injector, a fuel pump arranged to pressurize to fuel in the fuel reservoir for delivery to the fuel injector, a fuel return passage arranged to return excess fuel to the fuel reservoir, and a heat exchanger arranged to remove heat from the fuel flowing through the fuel return passage.

5. The internal combustion engine as set forth in claim 1, wherein the state passages converge to a common passage.

6. The internal combustion engine as set forth in claim 1, wherein the engine powers a marine propulsion system, the marine propulsion system includes a drive unit and a bracket assembly, the drive unit coupled to the bracket assembly for pivotal movement about a tilt axis, and the respective vents are disposed at different distances from the tilt axis relative to each other.

7. An outboard motor comprising a bracket assembly adapted to be mounted on an associated watercraft, and a drive unit coupled with the bracket assembly for pivotal movement about a tilt axis, the drive unit including an internal combustion engine, the engine comprising a cylinder body defining a cylinder bore, a piston disposed for reciprocation within the cylinder bore, a cylinder head member closing one end of the cylinder bore to define a combustion chamber with the cylinder bore and the piston, and a fuel supply system arranged to supply fuel for combustion in the combustion chamber, the fuel supply system including a fuel reservoir in which a space for fuel vapors is defined, and a pair of separate passages extending from the fuel reservoir at different vents spaced apart from each other, each separate passage being generally configured as a U-shape, the respective vents being disposed at different distances from the tilt axis relative to each other.

8. The outboard motor as set forth in claim 7, wherein the fuel supply system additionally includes a check valve mechanism arranged to release the fuel vapors from the fuel reservoir at a pressure of the fuel vapors that is greater than a preset pressure.

9. The outboard motor as set forth in claim 7, wherein the fuel supply system additionally includes a fuel injector, a fuel pump arranged to pressurize the fuel in the fuel reservoir for delivery to the fuel injector, a fuel return passage arranged to return excess fuel to the fuel reservoir, and a heat exchanger arranged to remove heat from the fuel flowing through the fuel return passage.

10. The outboard motor as set forth in claim 7, wherein the separate passages converge to a common passage.

* * * * *